United States Patent
Muroya et al.

(10) Patent No.: US 11,539,067 B2
(45) Date of Patent: Dec. 27, 2022

(54) METHOD FOR PRODUCING SECONDARY BATTERY

(71) Applicant: SANYO Electric Co., Ltd., Daito (JP)

(72) Inventors: Yohei Muroya, Hyogo (JP); Tomokazu Yamanaka, Hyogo (JP); Takuya Yamawaki, Hyogo (JP); Ryuhei Kai, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 128 days.

(21) Appl. No.: 16/708,589

(22) Filed: Dec. 10, 2019

(65) Prior Publication Data

US 2020/0243892 A1 Jul. 30, 2020

(30) Foreign Application Priority Data

Jan. 29, 2019 (JP) .............................. JP2019-012631

(51) Int. Cl.
*H01M 10/04* (2006.01)
*H01M 4/70* (2006.01)
*H01M 4/04* (2006.01)
*H01M 4/02* (2006.01)

(52) U.S. Cl.
CPC ......... *H01M 10/04* (2013.01); *H01M 4/0471* (2013.01); *H01M 4/70* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2009/0004561 A1* | 1/2009 | Nansaka | H01M 50/538 429/185 |
| 2011/0223454 A1* | 9/2011 | Urano | H01M 50/543 429/94 |
| 2012/0070720 A1 | 3/2012 | Aizawa et al. | |
| 2014/0193682 A1* | 7/2014 | Suzuki | H01M 4/64 429/94 |

(Continued)

FOREIGN PATENT DOCUMENTS

| | | |
|---|---|---|
| JP | 2012-125801 A | 7/2012 |
| JP | 2013-101977 A | 5/2013 |

*Primary Examiner* — Alix E Eggerding
(74) *Attorney, Agent, or Firm* — WHDA, LLP

(57) ABSTRACT

A secondary battery production method is provided, with which deformation of a current collector is reduced. The method produces a secondary battery including: an electrode assembly having positive and negative electrode plates; and a positive electrode current collector. The positive electrode plate includes a positive electrode core and a positive electrode active material layer, and the electrode assembly includes a positive electrode core-stacked portion. The method includes: an electrode assembly production step of producing the electrode assembly; and an ultrasonic bonding step of ultrasonically bonding the positive electrode current collector to the positive electrode core-stacked portion. The positive electrode current collector has a thin-walled portion. In the ultrasonic bonding step, the thin-walled portion and the positive electrode core-stacked portion are sandwiched between a horn and an anvil, and the thin-walled portion and the positive electrode core-stacked portion are ultrasonically bonded together.

5 Claims, 12 Drawing Sheets

(56) References Cited

U.S. PATENT DOCUMENTS

2014/0255768 A1* 9/2014 Jang .................... H01M 50/561
429/211
2018/0040918 A1* 2/2018 Guen .................. H01M 50/528

* cited by examiner

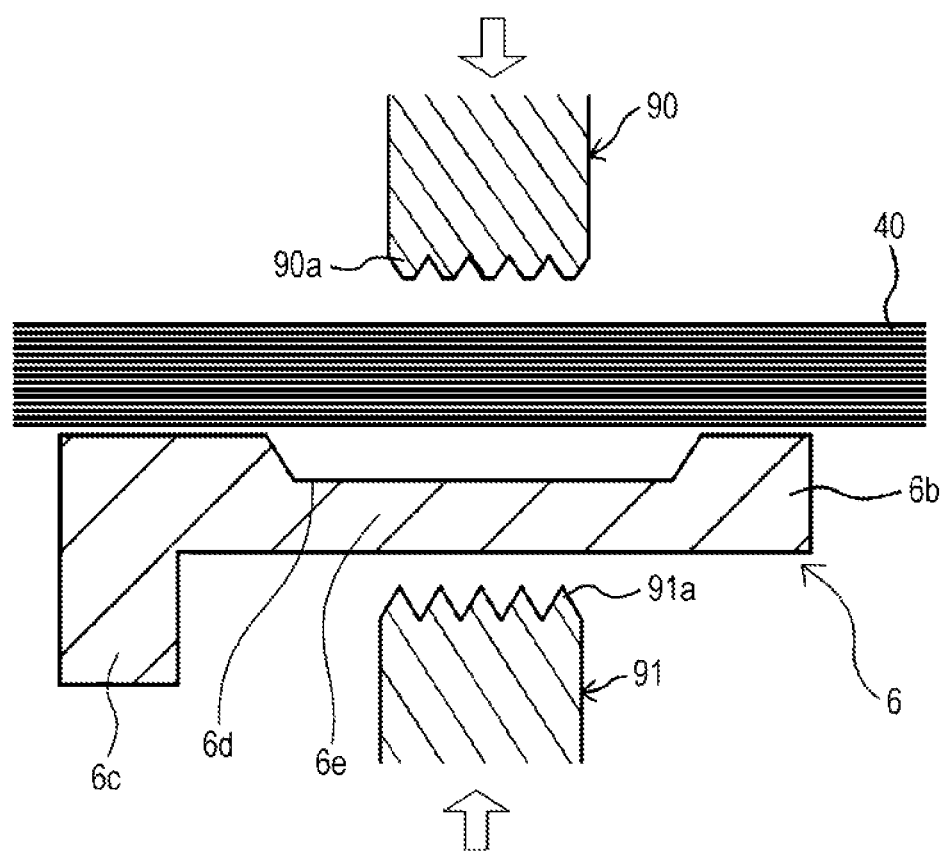

METHOD FOR PRODUCING SECONDARY BATTERY

CROSS REFERENCE TO RELATED APPLICATIONS

The present invention application claims priority to Japanese Patent Application No. 2019-012631 filed in the Japan Patent Office on Jan. 29, 2019, the entire contents of which are incorporated herein by reference.

BACKGROUND OF THE INVENTION

Field of the Invention

The present disclosure relates to a method for producing a secondary battery.

Description of Related Art

A secondary battery such as a lithium ion secondary battery has a structure in which an electrode assembly including a positive electrode plate and a negative electrode plate and an electrolyte are housed in a battery case. The positive electrode plate and the negative electrode plate included in the electrode assembly are prepared by forming respective active material layers on the surfaces of respective metal-made cores. Core-exposed portions formed in the positive and negative electrode plates are electrically connected through current collectors to respective terminals attached to the battery case.

One known method for joining a core and a current collector together is ultrasonic bonding. In the ultrasonic bonding, the core and the current collector stacked together are sandwiched between a horn and an anvil, and vibration energy of ultrasonic waves is applied to the joint surface.

To sandwich the core and the current collector in a reliable manner, a plurality of projections are formed on the surfaces of the horn and anvil.

For example, Japanese Published Unexamined Patent Application No. 2012-125801 (Patent Document 1) discloses a method in which an arc-shaped projection is formed on the surface of a horn and in which a margin region with no projection formed therein is provided in a peripheral region of the horn.

BRIEF SUMMARY OF THE INVENTION

One object of the present disclosure is to provide a secondary battery production method in which, when a core and a current collector is joined together, deformation of the current collector is reduced.

A secondary battery production method in one aspect of the present disclosure is a method for producing a secondary battery including
  a first electrode plate,
  a second electrode plate having a polarity different from the polarity of the first electrode plate,
  an electrode assembly including the first electrode plate and the second electrode plate, and
  a first electrode current collector electrically connected to the first electrode plate,
  wherein the first electrode plate includes a first electrode core and a first electrode active material layer formed on the first electrode core, and
  wherein the electrode assembly includes a first electrode core-stacked portion in which the first electrode core is stacked,
  the method including:
  an electrode assembly production step of producing the electrode assembly including the first electrode core-stacked portion; and
  an ultrasonic bonding step of ultrasonically bonding the first electrode current collector to the first electrode core-stacked portion,
  wherein, in the ultrasonic bonding step, the first electrode current collector has a thin-walled portion having a smaller thickness than surroundings thereof, and
  the thin-walled portion and the first electrode core-stacked portion are sandwiched between a horn and an anvil and then ultrasonically bonded together.

FIG. 17A shows the state in which a first electrode current collector 306 is placed on a first electrode core-stacked portion 340 and is a plan view showing the state before the first electrode core-stacked portion 340 and the first electrode current collector 306 are ultrasonically bonded together. FIG. 17B shows the state in which the first electrode current collector 306 is placed on the first electrode core-stacked portion 340 and is a plan view showing the state after the first electrode core-stacked portion 340 and the first electrode current collector 306 have been ultrasonically bonded together. When the first electrode core-stacked portion 340 and the first electrode current collector 306 are ultrasonically bonded together, the first electrode core-stacked portion 340 and the first electrode current collector 306 are pressed by a horn and an anvil to apply ultrasonic vibrations. Therefore, as shown in FIG. 17B, as a result of the ultrasonic bonding, the first electrode current collector 306 may be deformed such that its width increases. Suppose that the first electrode current collector 306 is deformed such that its width increases. In this case, when the electrode assembly to which the first electrode current collector 306 is connected is inserted into a battery case, the deformed portion of the first electrode current collector 306 may come into contact with the battery case, and the insertability of the electrode assembly into the battery case may deteriorate. Alternatively, the deformed portion of the first electrode current collector 306 may cause damage to an insulating sheet disposed between the electrode assembly and the battery case.

The secondary battery production method in the above aspect of the present disclosure can effectively prevent the first electrode current collector from being deformed such that its width increases when the first electrode current collector and the first electrode core-stacked portion are ultrasonically bonded together. Therefore, a more reliable secondary battery is provided. The first electrode plate may be a positive electrode plate or may be a negative electrode plate.

BRIEF DESCRIPTION OF THE SEVERAL VIEWS OF THE DRAWINGS

FIG. 4 is a cross-sectional view of a positive electrode current collector and a positive electrode core-stacked portion in the embodiment, showing the state before the positive electrode current collector and the positive electrode core-stacked portion are sandwiched between a horn and an anvil.

DETAILED DESCRIPTION OF THE INVENTION

A prismatic secondary battery 100, which is a secondary battery according to an embodiment of the present disclosure, will be described with reference to the drawings. The scope of the present disclosure is not limited to the following embodiment, and the embodiment can be freely modified within the technical idea of the present disclosure.

Figure 1:
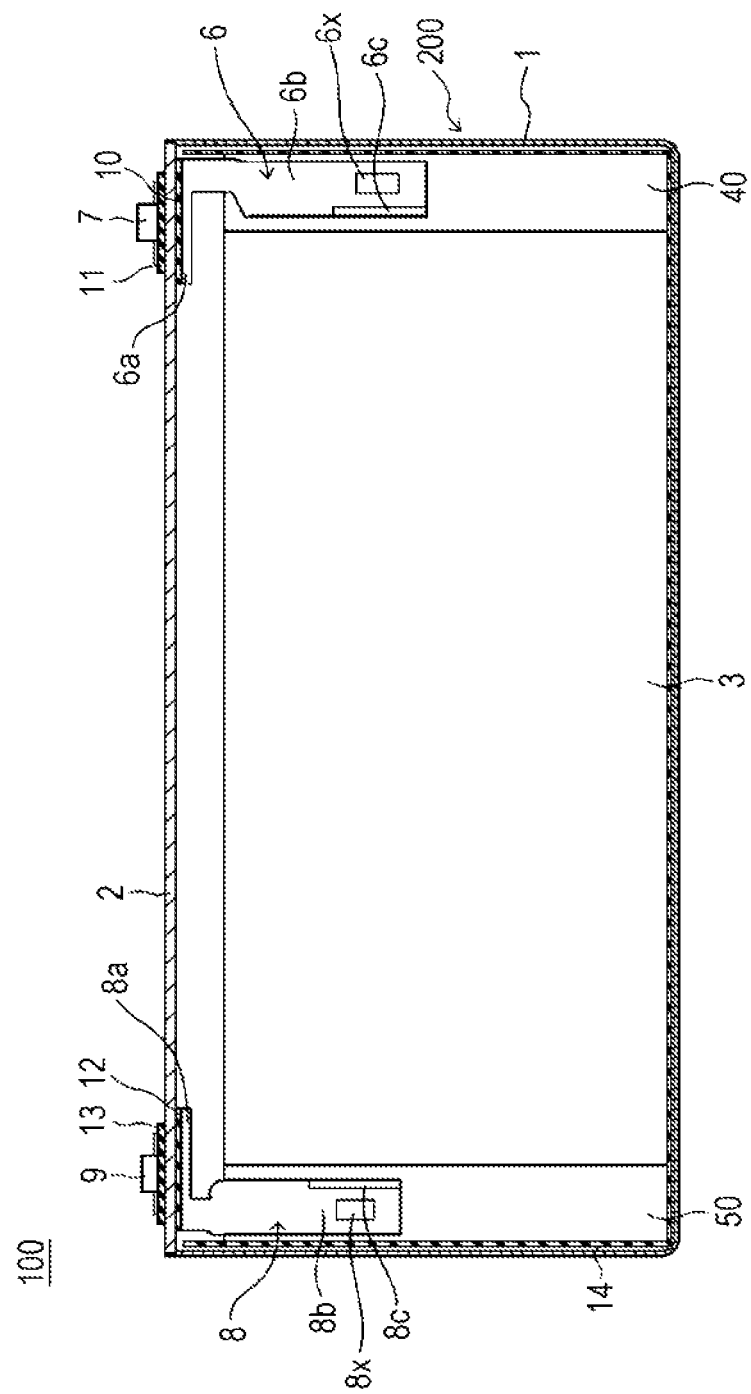
FIG. 1 is a schematic front view showing the interior of a prismatic secondary battery according to an embodiment with a front portion of a prismatic outer casing and a front portion of an insulating sheet removed.
Figure 2:
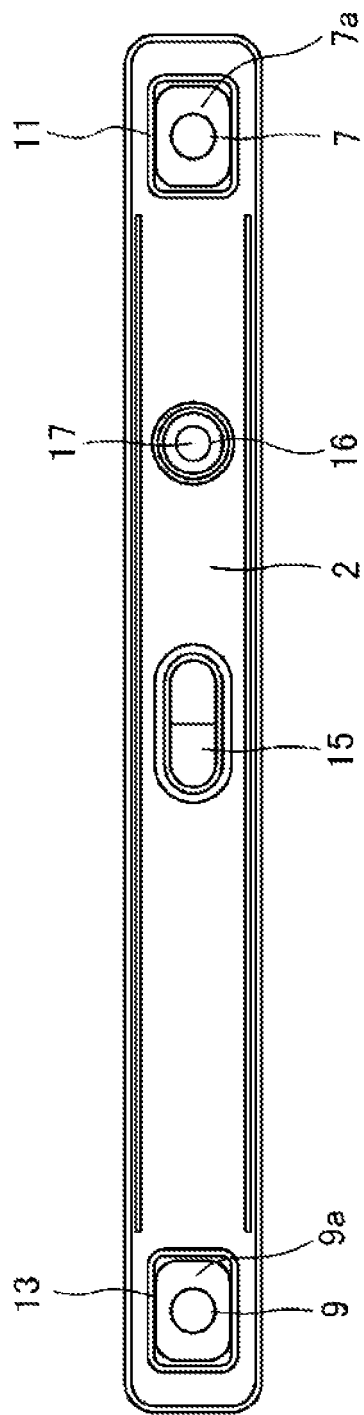
FIG. 2 is a top view of the prismatic secondary battery according to the embodiment.

The structure of the prismatic secondary battery 100 according to the embodiment will be described. As shown in FIGS. 1 and 2, the prismatic secondary battery 100 includes: a prismatic outer casing 1 having an upper opening; and a sealing plate 2 that seals the opening. The prismatic outer casing 1 and the sealing plate 2 form a battery case 200. The prismatic outer casing 1 and the sealing plate 2 are each made of metal and are preferably made of, for example, aluminum or an aluminum alloy. A strip-shaped positive electrode plate and a strip-shaped negative electrode plate are wound with a strip-shaped separator therebetween to form a flattened wound electrode assembly 3. The electrode assembly 3 and a non-aqueous electrolyte (not shown) are housed in the prismatic outer casing 1. A resin-made insulating sheet 14 is disposed between the prismatic outer casing 1 and the electrode assembly 3. A gas release valve 15 is disposed in the sealing plate 2. The gas release valve 15 breaks when the pressure inside the battery case 200 reaches a prescribed value or higher to thereby release the gas inside the battery case 200 to the outside thereof. An electrolyte injection hole 16 is provided in the sealing plate 2 and is sealed with a sealing member 17.

Figure 3A:
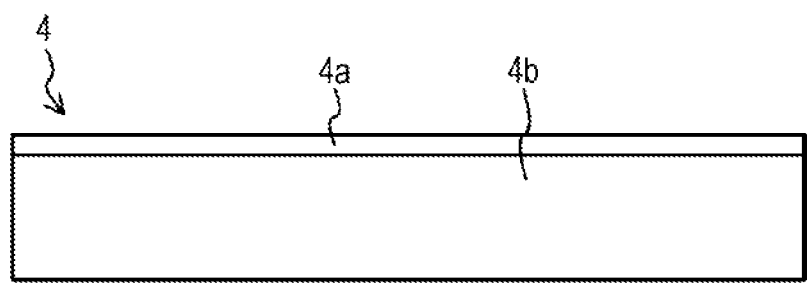
FIG. 3A is a plan view of a positive electrode plate in the embodiment.

As shown in FIG. 3A, the positive electrode plate 4 includes a metallic positive electrode core 4a and a positive electrode active material layer 4b formed on both sides of the positive electrode core 4a. The positive electrode plate 4 has a positive electrode core-exposed portion which is located in an edge portion, with respect to the width direction of the positive electrode plate 4, of the positive electrode core 4a and extends in the length direction of the positive electrode plate 4 and in which no positive electrode active material layer 4b is formed on both sides of the positive electrode core 4a. Preferably, the positive electrode core 4a is made of aluminum or an aluminum alloy. The positive electrode active material layer 4b contains a positive electrode active material. The positive electrode active material used is, for example, a lithium-transition metal complex oxide. Preferably, the positive electrode active material layer 4b contains a binder and a conductive agent. Preferably, the binder is a resin-made binder, and polyvinylidene fluoride, for example, may be used. Preferably, the conductive agent is a carbon material such as carbon black.

Figure 3B:
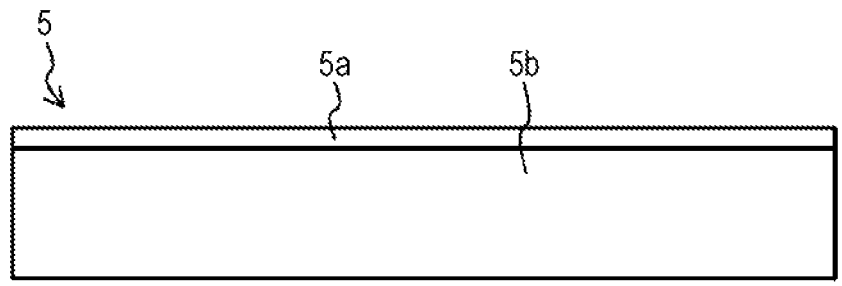
FIG. 3B is a plan view of a negative electrode plate in the embodiment.

As shown in FIG. 3B, the negative electrode plate 5 includes a metallic negative electrode core 5a and a negative electrode active material layer 5b formed on both sides of the negative electrode core 5a. The negative electrode plate 5 has a negative electrode core-exposed portion which is located in an edge portion, with respect to the width direction of the negative electrode plate 5, of the negative electrode core 5a and extends in the length direction of the negative electrode core 5a and in which no negative electrode active material layer 5b is formed on both sides of the negative electrode core 5a. Preferably, the negative electrode core 5a is made of copper or a copper alloy. The negative electrode active material layer 5b contains a negative electrode active material. The negative electrode active material used is, for example, a carbon material such as graphite or amorphous carbon or a silicon material such as silicon or silicon oxide. Preferably, the negative electrode active material layer 5b contains a binder. Preferably, the binder is a resin-made binder and contains, for example, styrene-butadiene rubber (SBR) and carboxymethyl cellulose (CMC). The negative electrode active material layer 5b may optionally contain a conductive agent.

The wound-type electrode assembly 3 has the wound positive electrode core-exposed portion in one edge portion and the wound negative electrode core-exposed portion in the other edge portion. The wound positive electrode core-exposed portion forms a positive electrode core-stacked portion 40 including stacked layers of the positive electrode core 4a. The wound negative electrode core-exposed portion forms a negative electrode core-stacked portion 50 including stacked layers of the negative electrode core 5a.

A positive electrode current collector 6 is connected to the positive electrode core-stacked portion 40. The positive electrode current collector 6 is connected to a positive electrode terminal 7 mounted on the sealing plate 2. A resin-made inner insulating member 10 is disposed between the sealing plate 2 and the positive electrode current collector 6. A resin-made outer insulating member 11 is disposed between the sealing plate 2 and the positive electrode terminal 7. The positive electrode current collector 6 and the positive electrode terminal 7 are electrically insulated from the sealing plate 2 by the inner insulating member 10 and the outer insulating member 11. The positive electrode current collector 6 and the positive electrode terminal 7 are made of metal and preferably made of aluminum or an aluminum alloy.

A negative electrode current collector 8 is connected to the negative electrode core-stacked portion 50. The negative electrode current collector 8 is connected to a negative electrode terminal 9 mounted on the sealing plate 2. A resin-made inner insulating member 12 is disposed between the sealing plate 2 and the negative electrode current collector 8. A resin-made outer insulating member 13 is disposed between the sealing plate 2 and the negative electrode terminal 9. The negative electrode current collector 8 and the negative electrode terminal 9 are electrically insulated from the sealing plate 2 by the inner insulating member 12 and the outer insulating member 13. The negative electrode current collector 8 and the negative electrode terminal 9 are made of metal and preferably made of, for example, copper or a copper alloy. Preferably, the negative electrode terminal 9 includes a portion made of copper or a copper alloy and a portion made of aluminum or an aluminum alloy. Preferably, the portion of the negative electrode terminal 9 that is made of copper or a copper alloy is connected to the negative electrode current collector 8 made of copper or a copper alloy, and the portion of the negative electrode terminal 9 that is made of aluminum or an aluminum alloy is exposed to the outside from the sealing plate 2.

The positive electrode terminal 7 includes a flange portion 7a disposed on the battery outer side of the sealing plate 2 and an insertion portion (not shown) formed on one surface of the flange portion 7a. The insertion portion passes through a positive electrode terminal mounting hole (not shown) provided in the sealing plate 2 and is connected to the positive electrode current collector 6.

The negative electrode terminal 9 includes a flange portion 9a disposed on the battery outer side of the sealing plate 2 and an insertion portion (not shown) formed on the one surface of the flange portion 9a. The insertion portion passes through a negative electrode terminal mounting hole (not shown) provided in the sealing plate 2 and is connected to the negative electrode current collector 8.

The positive electrode current collector 6 and the positive electrode terminal 7 may be electrically connected to each other through another conductive member. The negative electrode current collector 8 and the negative electrode terminal 9 may be electrically connected to each other through another conductive member.

The positive electrode current collector 6 includes: a base portion 6a disposed between the sealing plate 2 and the electrode assembly 3; and a lead portion 6b extending from an edge portion of the base portion 6a toward the electrode assembly 3. The positive electrode terminal 7 is connected to the base portion 6a. The lead portion 6b is joined to the positive electrode core-stacked portion 40. A rib 6c is provided at an edge, with respect to the width direction, of the lead portion 6b. The rib 6c may be omitted.

The negative electrode current collector 8 includes: a base portion 8a disposed between the sealing plate 2 and the electrode assembly 3; and a lead portion 8b extending from an edge portion of the base portion 8a toward the electrode assembly 3. The negative electrode terminal 9 is connected to the base portion 8a. The lead portion 8b is joined to the negative electrode core-stacked portion 50. A rib 8c is provided at an edge, with respect to the width direction, of the lead portion 8b. The rib 8c may be omitted.

The lead portion 6b of the positive electrode current collector 6 has an irregularity-formed portion 6x that is formed on a surface opposite to the surface joined to the positive electrode core-stacked portion 40 and located in a portion joined to the positive electrode core-stacked portion 40. The irregularity-formed portion 6x is formed by anvil projections of an anvil that dig into the positive electrode current collector 6 when the positive electrode current collector 6 and the positive electrode core-stacked portion 40 are ultrasonically bonded together. Specifically, the irregularity-formed portion 6x includes indentations formed by the anvil.

The lead portion 8b of the negative electrode current collector 8 has an irregularity-formed portion 8x that is formed on a surface opposite to the surface joined to the negative electrode core-stacked portion 50 and located in a portion joined to the negative electrode core-stacked portion 50. The irregularity-formed portion 8x is formed by the anvil projections of the anvil that dig into the negative electrode current collector 8 when the negative electrode current collector 8 and the negative electrode core-stacked portion 50 are ultrasonically bonded together. Specifically, the irregularity-formed portion 8x includes indentations formed by the anvil.

Mounting of Components on Sealing Plate

A method for mounting the positive electrode current collector 6, the positive electrode terminal 7, the negative electrode current collector 8, and the negative electrode terminal 9 on the sealing plate 2 will next be described.

First, the outer insulating member 11 is placed on the battery outer side of the sealing plate 2 in a region around the positive electrode terminal mounting hole (not shown) provided in the sealing plate 2, and the inner insulating member 10 and the base portion 6a of the positive electrode current collector 6 are placed on the inner surface side of the sealing plate 2. Next, the insertion portion of the positive electrode terminal 7 is inserted from the battery outer side into a through hole of the outer insulating member 11, the positive electrode terminal mounting hole of the sealing plate 2, a through hole of the inner insulating member 10, and a through hole of the base portion 6a, and then a forward end portion of the insertion portion of the positive electrode terminal 7 is crimped to the base portion 6a. In this manner, the positive electrode terminal 7, the outer insulating member 11, the sealing plate 2, the inner insulating member 10, and the positive electrode current collector 6 are integrally fixed together. The crimped portion at the forward end of the insertion portion of the positive electrode terminal 7 may be welded to the base portion 6a.

Similarly, the outer insulating member 13 is placed on the battery outer side of the sealing plate 2 in a region around the negative electrode terminal mounting hole (not shown) provided in the sealing plate 2, and the inner insulating member 12 and the base portion 8a of the negative electrode current collector 8 are placed on the battery inner side of the sealing plate 2. Next, the insertion portion of the negative electrode terminal 9 is inserted from the battery outer side into a through hole of the outer insulating member 13, the negative electrode terminal mounting hole of the sealing plate 2, a through hole of the inner insulating member 12, and a through hole of the base portion 8a, and a forward end portion of the insertion portion of the negative electrode terminal 9 is crimped to the base portion 8a. In this manner, the negative electrode terminal 9, the outer insulating member 13, the sealing plate 2, the inner insulating member 12, and the negative electrode current collector 8 are integrally fixed together. The crimped portion at the forward end of the insertion portion of the negative electrode terminal 9 may be welded to the base portion 8a.

Assembly of Prismatic Secondary Battery 100

The positive electrode current collector 6 mounted on the sealing plate 2 is joined to the positive electrode core-stacked portion 40, and the negative electrode current collector 8 mounted on the sealing plate 2 is joined to the negative electrode core-stacked portion 50. Then the electrode assembly 3 is covered with the insulating sheet 14, and the electrode assembly 3 covered with the insulating sheet 14 is inserted into the prismatic outer casing 1. The sealing plate 2 is laser-welded to the prismatic outer casing 1 to seal the opening of the prismatic outer casing 1 with the sealing plate 2. A non-aqueous electrolyte is injected from the electrolyte injection hole 16 of the sealing plate 2 into the battery case 200, and then the electrolyte injection hole 16 is sealed with the sealing member 17. The prismatic secondary battery 100 is thereby prepared.

A method for joining a current collector to a core-stacked portion will be described using, as an example, a method for joining the positive electrode current collector 6 to the positive electrode core-stacked portion 40. A method for joining the negative electrode current collector 8 to the negative electrode core-stacked portion 50 is similar to the above method.

Joining of Current Collector to Core-Stacked Portion

Figure 5:
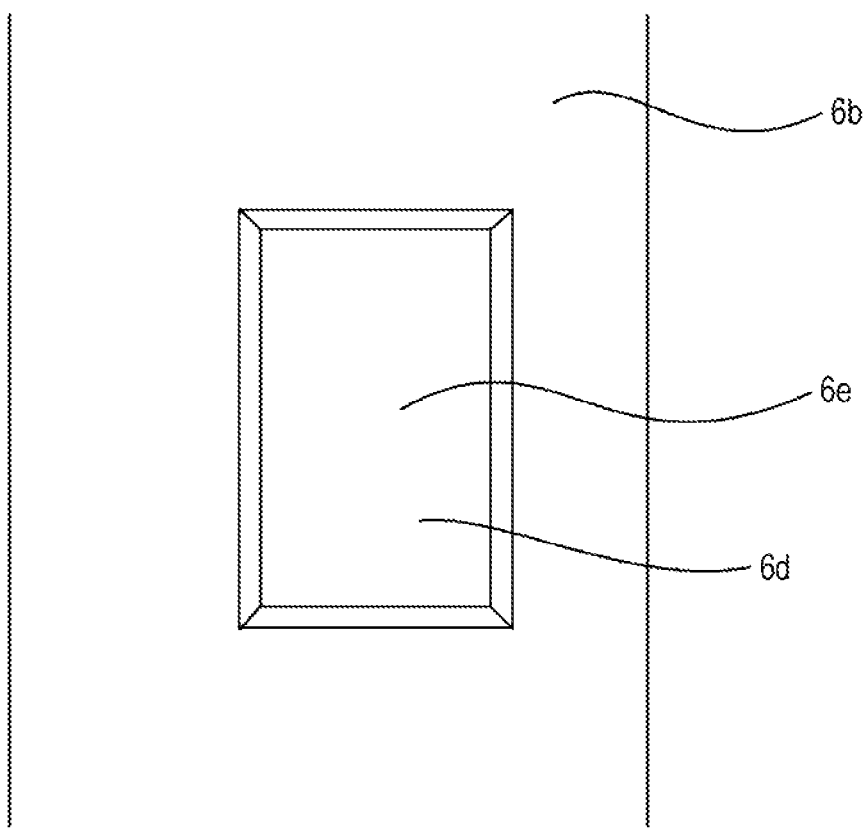
FIG. 5 is a plan view of a surface of the positive electrode current collector in the embodiment, to which surface the positive electrode core-stacked portion is to be joined, the plan view showing the state before the surface and the positive electrode core-stacked portion are joined together.

As shown in FIGS. 4 and 5, the positive electrode current collector 6 used has a thin-walled portion 6e provided in the lead portion 6b. In the lead portion 6b, a recess 6d is formed on a surface facing the positive electrode core-stacked portion 40, and the thin-walled portion 6e having a smaller thickness than its surroundings is thereby formed. FIG. 4 is a cross-sectional view in the width direction of the lead portion 6b and is a cross-sectional view in the left-right direction in FIG. 1.

As shown in FIG. 4, the positive electrode core-stacked portion 40 is disposed on the surface of the lead portion 6b on which the recess 6d is formed. The positive electrode core-stacked portion 40 and the lead portion 6b are sandwiched between a horn 90 and an anvil 91. The horn 90 has a plurality of horn projections 90a at its forward end. The horn projections 90a are to be in contact with the positive electrode core-stacked portion 40. The anvil 91 has a plurality of anvil projections 91a at its forward end. The anvil projections 91a are to be in contact with the lead portion 6b.

Figure 6:
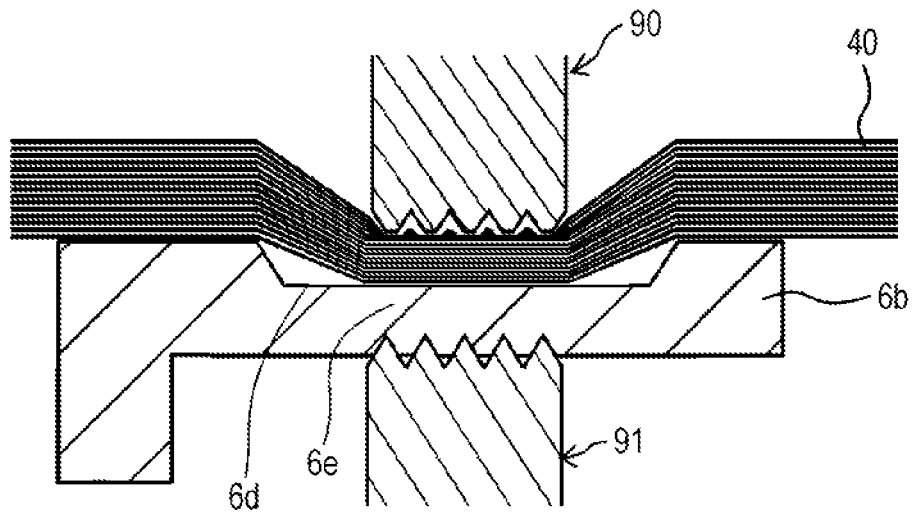
FIG. 6 is a cross-sectional view of the positive electrode current collector and the positive electrode core-stacked portion in the embodiment, showing the state after the positive electrode current collector and the positive electrode core-stacked portion have been sandwiched between the horn and the anvil.
Figure 7:
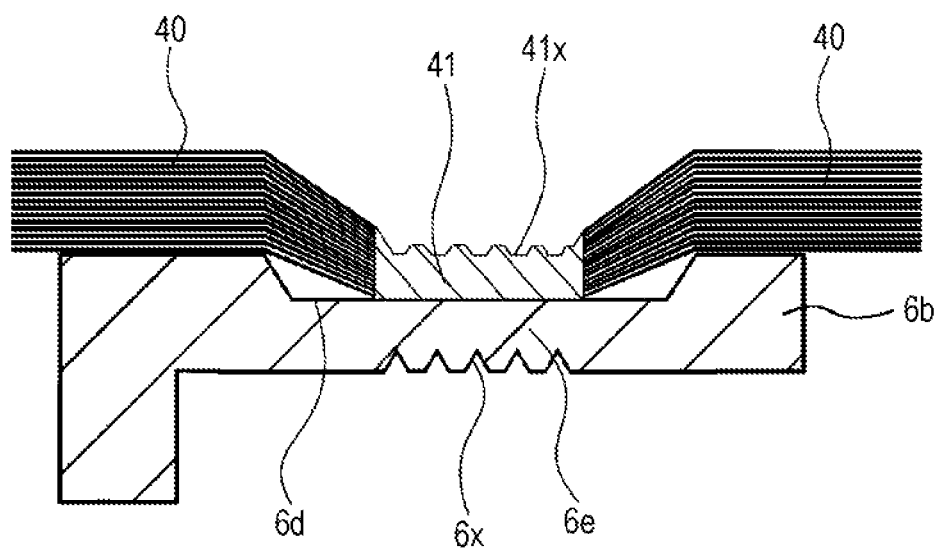
FIG. 7 is a cross-sectional view of the positive electrode current collector and the positive electrode core-stacked portion in the embodiment, showing the state after the positive electrode current collector and the positive electrode core-stacked portion have been ultrasonically bonded together.

As shown in FIG. 6, by sandwiching the positive electrode core-stacked portion 40 and the lead portion 6b between the horn 90 and the anvil 91, the horn projections 90a dig into the positive electrode core-stacked portion 40, and the anvil projections 91a dig into the lead portion 6b. Then ultrasonic vibrations are applied to the horn 90. The stacked layers of the positive electrode core 4a in the positive electrode core-stacked portion 40 are thereby joined together, and the positive electrode core-stacked portion 40 and the lead portion 6b are joined together as shown in FIG. 7. A joined portion 41 is thereby formed in the positive electrode core-stacked portion 40.

The positive electrode core-stacked portion 40 is joined to the thin-walled portion 6e of the lead portion 6b. Specifically, at least part of the joined portion 41 is disposed in the recess 6d. A core-side irregularity-formed portion 41x is formed on the surface of the positive electrode core-stacked portion 40. The irregularity-formed portion 6x, which includes the indentations formed by the anvil 91, is formed in the lead portion 6b.

In the lead portion 6b of the positive electrode current collector 6 in the above structure, the thin-walled portion 6e with a smaller thickness than its surroundings is sandwiched between the horn 90 and the anvil 91 and pressed thereby. When the lead portion 6b is pressed, the metal forming the lead portion 6b moves from the pressed portion of the lead portion 6b. With the above structure, the amount of the metal moved can be reduced. Moreover, since a portion thicker than the thin-walled portion 6e is present around the thin-walled portion 6e, the deformation of the lead portion 6b in the thickness direction can be effectively reduced. By reducing the thickness of the portion of the lead portion 6b that is joined to the positive electrode core-stacked portion 40, the energy necessary for ultrasonic bonding can be reduced, so that the deformation of the lead portion 6b can be more effectively reduced.

As described above, in the above structure, even when the positive electrode core-stacked portion 40 and the lead portion 6b are sandwiched between the horn 90 and the anvil 91 and ultrasonically bonded together, the deformation of the lead portion 6b that causes an increase in width can be effectively reduced.

Preferably, regions thicker than the thin-walled portion 6e are formed on both sides, with respect to the width direction of the lead portion 6b (the left-right direction in FIG. 7), of the thin-walled portion 6e.

The thickness of the thin-walled portion 6e is preferably 20 to 70% of the thickness of its surroundings, more preferably 20 to 65%, and still more preferably 20% to 30%. This is also the case when a thin-walled portion is provided in the lead portion 8b of the negative electrode current collector 8.

The thin-walled portion 6e made of aluminum or an aluminum alloy has a thickness of preferably 0.2 to 1 mm, more preferably 0.2 to 0.9 mm, and still more preferably 0.2 to 0.4 mm.

When a thin-walled portion is formed in the lead portion 8b of the negative electrode current collector 8 made of copper or a copper alloy, the thickness of the thin-walled portion is preferably 0.1 to 0.6 mm, more preferably 0.1 to 0.5 mm, and still more preferably 0.1 to 0.2 mm.

Preferably, the rib 6c is provided at one edge, with respect to the width direction, of the lead portion 6b. By providing the rib 6c, the deformation of the lead portion 6b during ultrasonic bonding can be more effectively reduced. Preferably, the rib 6c is formed on a surface of the lead portion 6b that is opposite to the surface on which the positive electrode core-stacked portion 40 is disposed. Preferably, the edge, with respect to the width direction, of the lead portion 6b at which the rib 6c is formed is located on the center side of the electrode assembly 3. This can prevent damage to the electrode assembly 3 that occurs when the side edge portion of the lead portion 6b is deformed so as to come into contact with the electrode assembly 3.

The width of the recess 6d in the width direction of the lead portion 6b is preferably 30 to 95% of the width of the lead portion 6b, more preferably 30 to 80%, and still more preferably 30 to 70%. This is also the case when a recess is provided in the lead portion 8b of the negative electrode current collector 8.

As for the lead portion 6b made of aluminum or an aluminum alloy, the width of the recess 6d in the width direction of the lead portion 6b is preferably 2 to 10 mm, more preferably 2 to 6 mm, and still more preferably 2 to 5 mm.

When a recess is provided in the lead portion 8b of the negative electrode current collector 8 made of copper or a copper alloy, the width of the recess in the width direction of the lead portion 8b is preferably 2 to 10 mm, more preferably 2 to 6 mm, and still more preferably 2 to 5 mm.

The width of portions formed on both sides, with respect to the width direction of the lead portion 6b, of the thin-walled portion 6e and thicker than the thin-walled portion 6e is preferably 0.5 mm or more and more preferably 1 mm or more. This is also the case when a thin-walled portion is provided in the lead portion 8b of the negative electrode current collector 8.

A portion of the horn 90 that is to be in contact with the positive electrode core-stacked portion 40 has a width smaller than the width of the recess 6d. A portion of the anvil 91 that is to be in contact with the lead portion 6b has a width smaller than the width of the recess 6d. The irregularity-formed portion 6x formed by ultrasonic bonding has a width smaller than the width of the recess 6d. The width of the recess 6d is the width of the bottom surface of the recess 6d.

When the recess 6d is provided on the surface of the lead portion 6b that faces the positive electrode core-stacked portion 40, it is preferable that the side surfaces of the recess 6d are inclined with respect to the bottom surface of the recess 6d. Specifically, as shown in FIG. 4, the angle between each side surface of the recess 6d and its bottom surface is preferably an obtuse angle. In this case, damage to the positive electrode core-stacked portion 40 can be prevented. Preferably, the edges of the recess 6d are rounded or chamfered.

Modification 1

FIGS. 8 to 11 show a mode of joining a positive electrode current collector and a positive electrode core-stacked portion in modification 1. The shape of the lead portion of the positive electrode current collector in modification 1 differs from that in the above embodiment. In the positive electrode current collector 106 in modification 1, a recess 106d is provided on a surface of the lead portion 106b that is opposite to the surface facing the positive electrode core-stacked portion 40, and a thin-walled portion 106e is thereby formed in the lead portion 106b. The positive electrode current collector 106 has a rib 106c at an edge, with respect to the width direction, of the lead portion 106b.

Figure 8:
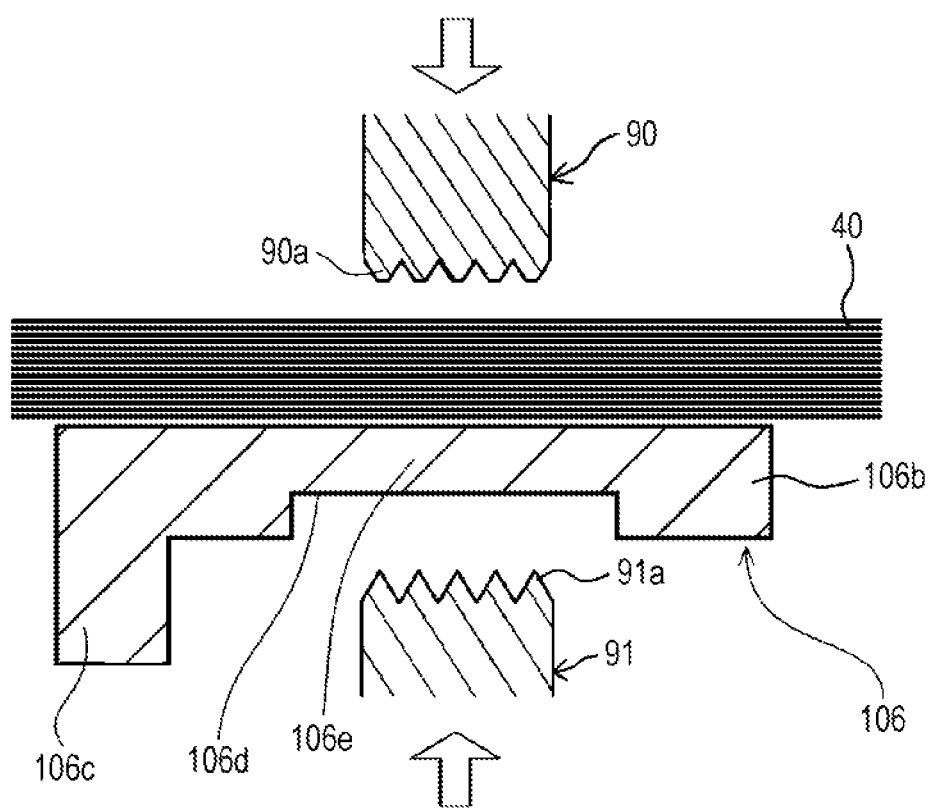
FIG. 8 is a cross-sectional view of a positive electrode current collector and a positive electrode core-stacked portion in modification 1, showing the state before the positive electrode current collector and the positive electrode core-stacked portion are sandwiched between the horn and the anvil.

As shown in FIG. 8, the positive electrode core-stacked portion 40 is disposed on a surface of the lead portion 106b that is opposite to the surface on which the recess 106d is formed. Then the positive electrode core-stacked portion 40 and the lead portion 106b are sandwiched between the horn 90 and the anvil 91.

Figure 9:
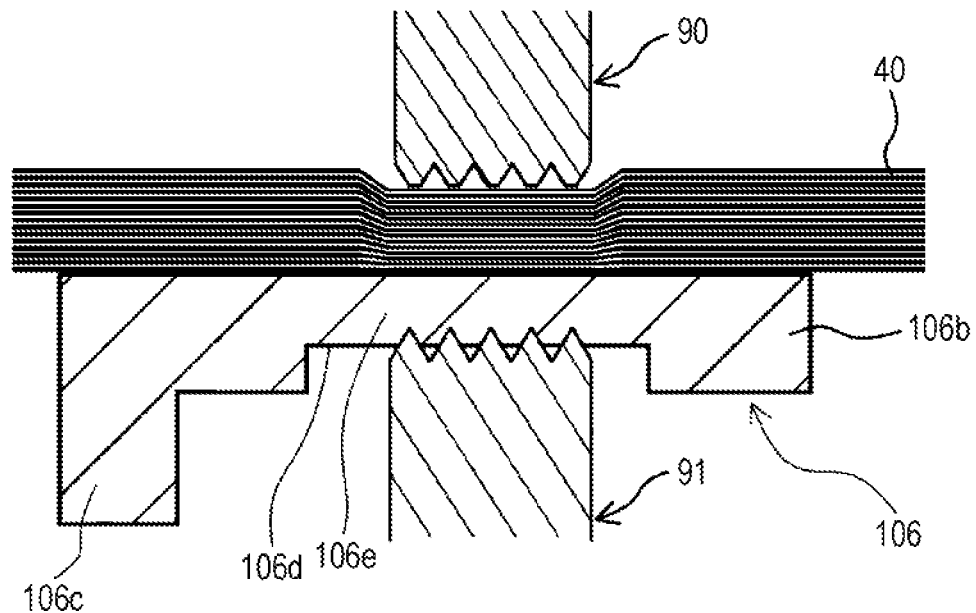
FIG. 9 is a cross-sectional view of the positive electrode current collector and the positive electrode core-stacked portion in modification 1, showing the state after the positive electrode current collector and the positive electrode core-stacked portion have been sandwiched between the horn and the anvil.

As shown in FIG. 9, the anvil 91 is brought into contact with the bottom surface of the recess 106d formed in the lead portion 106b. The anvil projections 91a of the anvil 91 thereby dig into the bottom surface of the recess 106d.

Figure 10:
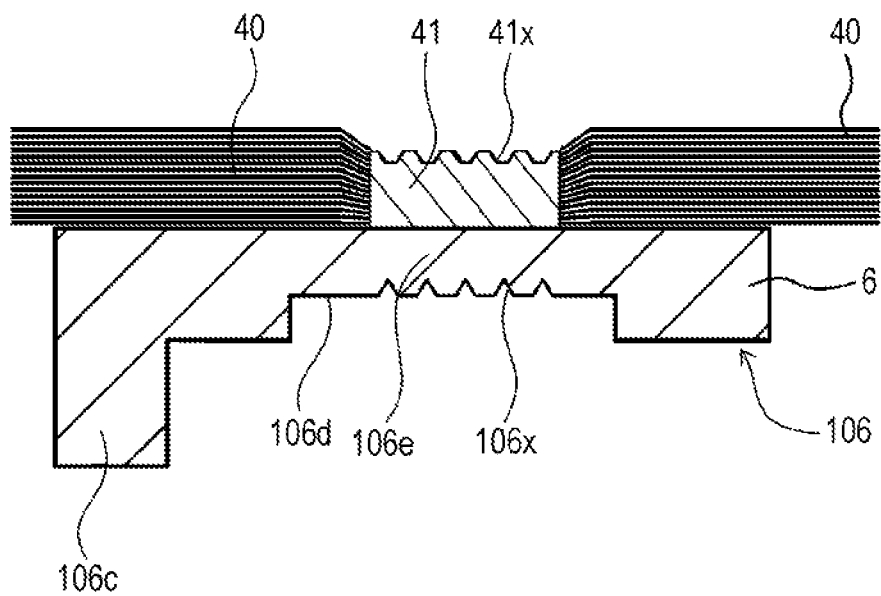
FIG. 10 is a cross-sectional view of the positive electrode current collector and the positive electrode core-stacked portion in modification 1, showing the state after the positive electrode current collector and the positive electrode core-stacked portion have been ultrasonically bonded together.
Figure 11:
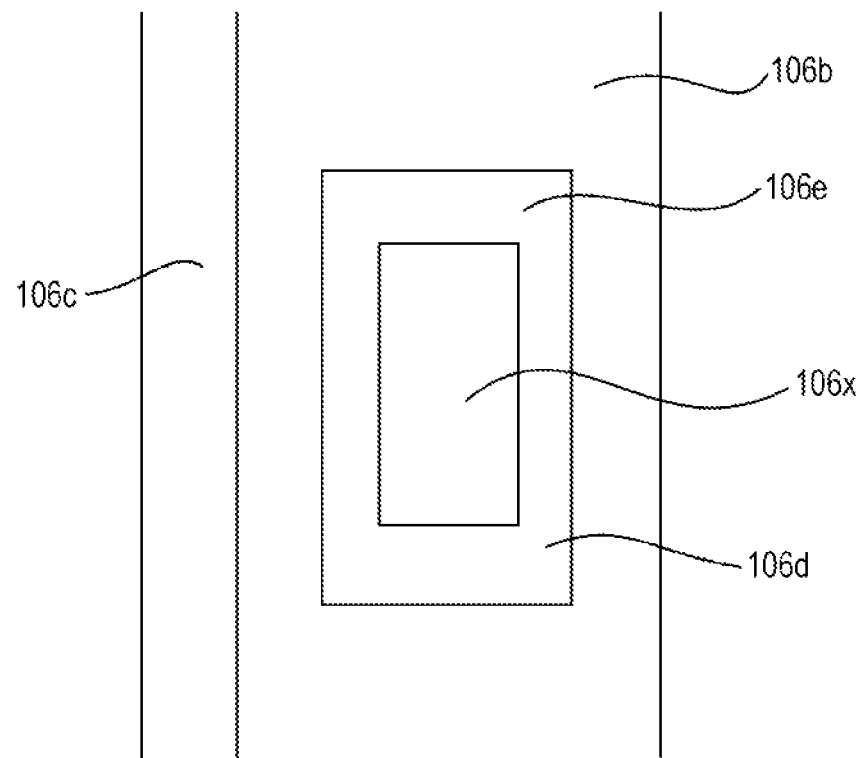
FIG. 11 is an illustration showing the surface of a portion of the positive electrode current collector in modification 1, to which portion the positive electrode core-stacked portion is joined, the surface of the portion being opposite to the surface to which the positive electrode core-stacked portion is joined, the illustration showing the state after the positive electrode core-stacked portion has been joined to the positive electrode current collector.

As shown in FIGS. 10 and 11, the lead portion 106b and the positive electrode core-stacked portion 40 are joined together in the thin-walled portion 106e of the lead portion 106b. Stacked layers of the positive electrode core 4a in the positive electrode core-stacked portion 40 are joined together, and the positive electrode core 4a and the lead portion 106b are joined together. A joined portion 41 is thereby formed. An irregularity-formed portion 106x, which includes indentations formed in the lead portion 106b by the anvil 91, is formed on the bottom surface of the recess 106d. A core-side irregularity-formed portion 41x is formed on the surface of the joined portion 41 in the positive electrode core-stacked portion 40.

In the structure of modification 1, ultrasonic bonding is performed on the thin-walled portion 106e that is thinner than portions on both sides thereof with respect to the width direction of the lead portion 106b. This can effectively reduce the deformation of the lead portion 106b that causes an increase in its width during ultrasonic bonding. The sizes etc. of the recess 106d and the thin-walled portion 106e may be the same as those in the above embodiment.

Modification 2

Figure 12:
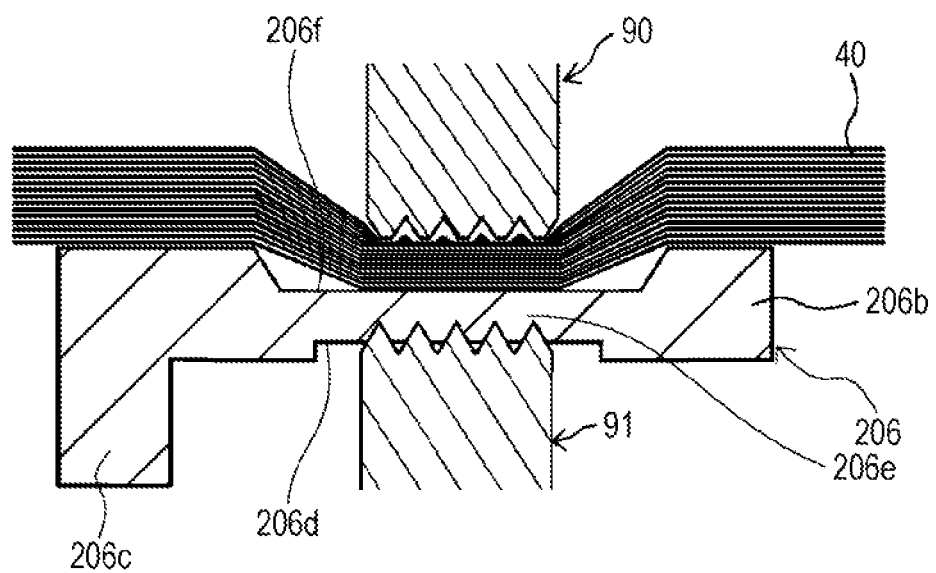
FIG. 12 is a cross-sectional view of a positive electrode current collector and a positive electrode core-stacked portion in modification 2, showing the state after the positive electrode current collector and the positive electrode core-stacked portion have been sandwiched between the horn and the anvil.
Figure 13:
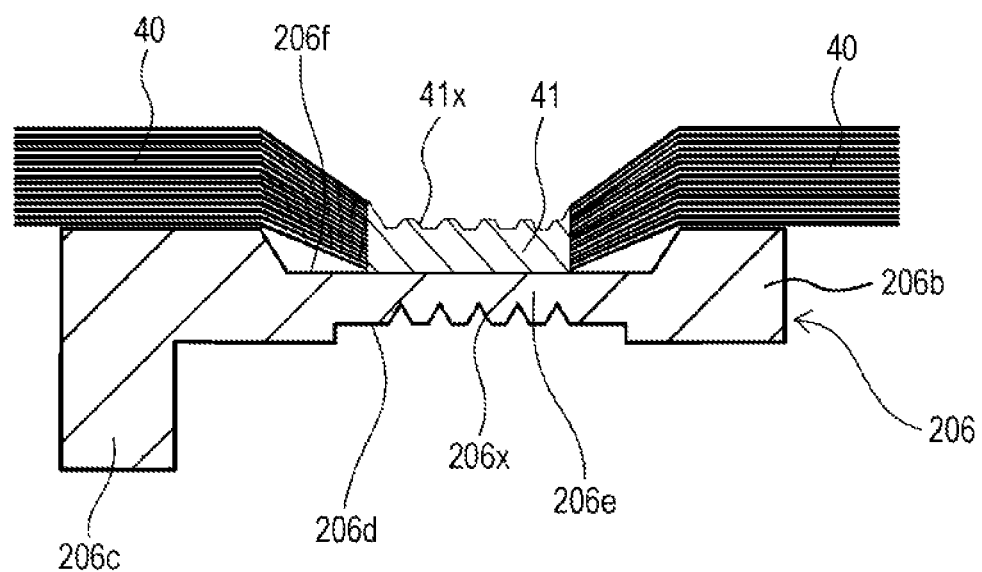
FIG. 13 is a cross-sectional view of the positive electrode current collector and the positive electrode core-stacked portion in modification 2, showing the state after the positive electrode current collector and the positive electrode core-stacked portion have been ultrasonically bonded together.

FIGS. 12 and 13 show a mode of joining a positive electrode current collector and a positive electrode core-stacked portion in modification 2. The shape of the lead portion of the positive electrode current collector in modification 2 differs from that of the above embodiment. In the positive electrode current collector 206 in modification 2, recesses (an outer recess 206d and an inner recess 206f) are formed on both sides of the lead portion 206b. A thin-walled portion 206e is thereby formed in the lead portion 206b. The lead portion 206b and the positive electrode core-stacked portion 40 are joined together in the thin-walled portion 206e.

As shown in FIG. 13, the positive electrode core-stacked portion 40 is joined to the bottom surface of the inner recess 206f of the lead portion 206b, and the joined portion 41 is thereby formed. An irregularity-formed portion 206x, which includes indentations formed by the anvil 91, is formed on the bottom surface of the outer recess 206d of the lead portion 206b. A rib 206c is formed at an edge, with respect to the width direction, of the lead portion 206b.

In modification 2, the thin-walled portion 206e is formed by forming the recesses on both sides of the lead portion 206b and is ultrasonically bonded to the positive electrode core-stacked portion 40. When the lead portion 206b is pressed, the metal forming the lead portion 206b moves from the pressed portion of the lead portion 206b. With the above structure, the amount of the metal moved can be reduced. Moreover, since a portion thicker than the thin-walled portion 206e is present around the thin-walled portion 206e, the deformation of the lead portion 206b in the width direction can be effectively reduced. By reducing the thickness of the portion of the lead portion 206b that is joined to the positive electrode core-stacked portion 40, the energy necessary for ultrasonic bonding can be reduced, so that the deformation of the lead portion 206b can be more effectively reduced. Since the recesses are formed on both sides of the lead portion 206b, the depth of the recess (the inner recess 206f) formed on the surface of the lead portion 206b that faces the positive electrode core-stacked portion 40 can be reduced. Therefore, the deformation of the positive electrode core-stacked portion 40 when it is pressed by the horn 90 can be further reduced, and the ultrasonic bonding can be performed more stably.

Modification 3

Figure 14:
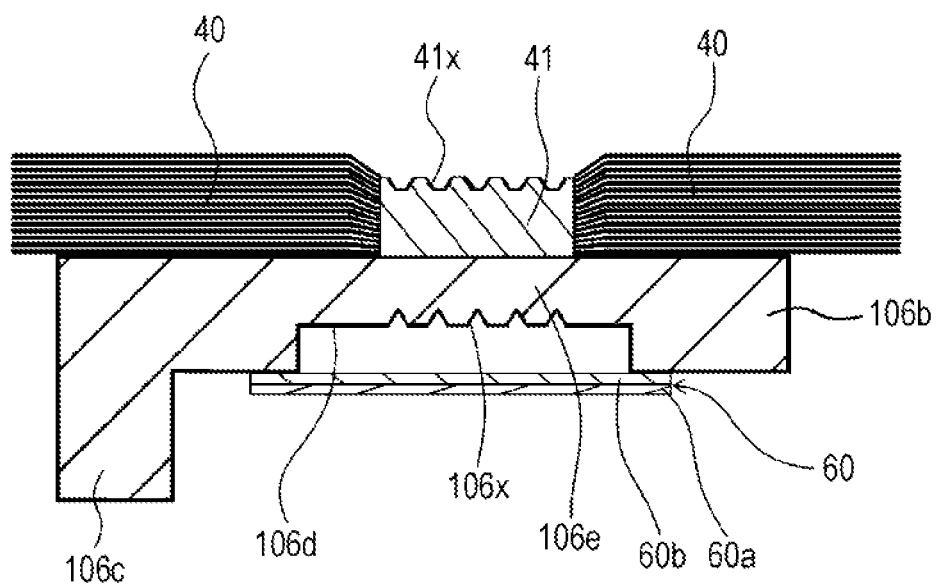
FIG. 14 is a cross-sectional view of the positive electrode current collector and the positive electrode core-stacked portion in modification 2, showing the state after a tape has been applied to the positive electrode current collector.
Figure 15:
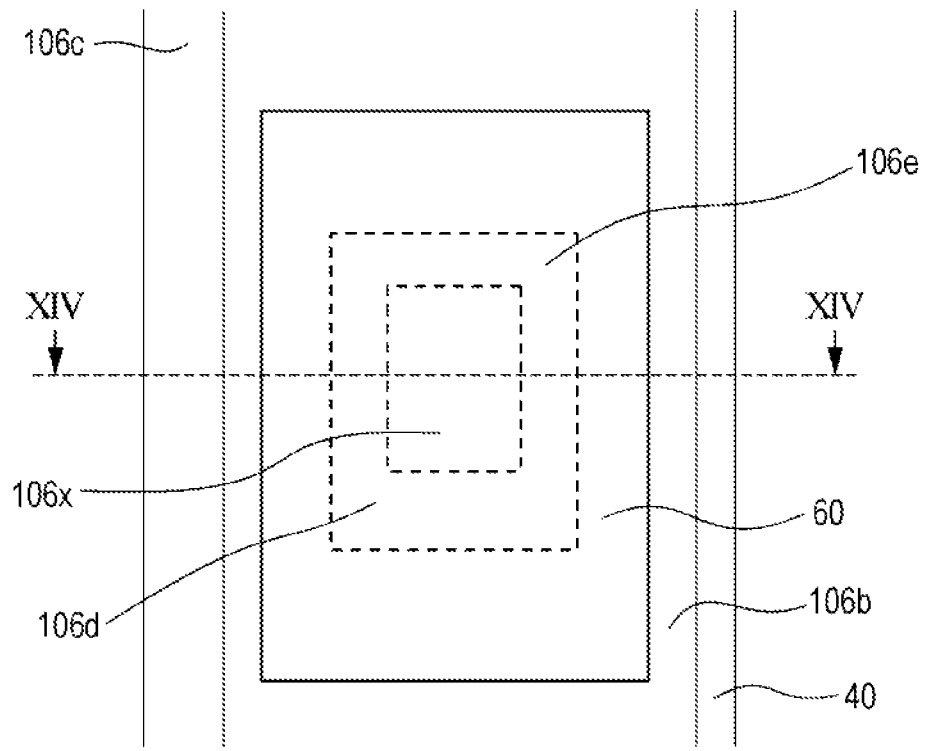
FIG. 15 is a plan view of the positive electrode current collector and the positive electrode core-stacked portion in modification 2, showing the state after the tape has been applied to the positive electrode current collector.

FIGS. 14 and 15 show modification 3. FIG. 14 is a cross-sectional view taken along XIV-XIV in FIG. 15. The structure in modification 3 is the same as the structure in modification 1 except that a tape is applied to the positive electrode current collector.

As shown in FIGS. 14 and 15, the tape 60 is applied to the lead portion 106b of the positive electrode current collector 106. The tape 60 is disposed so as to cover the irregularity-formed portion 106x and is applied around the recess 106d. During ultrasonic bonding, small metal pieces may be formed and adhere to the irregularity-formed portion 106x, or burrs formed in the irregularity-formed portion 106x may be separated to form small metal pieces. In the above structure, these small metal pieces are confined in the space formed by the recess 106d and the tape 60. This can effectively prevent the small metal pieces from entering the inside of the electrode assembly 3 to cause a short circuit.

Preferably, the tape 60 includes a substrate layer 60a and a bonding layer 60b formed on the substrate layer 60a. Preferably, the substrate layer 60a is formed from a material selected from polypropylene, polyimide, polyphenylene sulfide, polyethylene, polyester, polyethylene naphthalate, etc. or a mixture thereof. Particularly preferably, the substrate layer 60a is formed from polypropylene. Preferably, the substrate layer 60a has a thickness of 20 μm to 200 μm. Preferably, the bonding layer 60b has adhesiveness at room temperature (25°). The bonding layer 60b may be heat bondable. Preferably, the bonding layer 60b may be formed from a material selected from rubber-based adhesives, acrylic-based adhesives, polyethylene-based adhesives, etc. or a mixture thereof. Particularly preferably, the bonding layer 60b is formed from a rubber-based adhesive. The tape 60 may be composed of a single layer. For example, the tape 60 may be formed of a heat-bondable resin and may be heat-bonded to the positive electrode current collector 106.

Instead of the tape 60, a cover member may be connected to the positive electrode current collector 106 so as to cover the recess 106d. The cover member may be a member having a sheet shape, a plate shape, a block shape, etc. The cover member may be made of a resin, a ceramic, or a metal. The cover member may be connected to the positive electrode current collector 106 by bonding, welding, fitting, etc.

The surface of the irregularity-formed portion 106x may be coated with a resin. When the resin applied to the surface of the irregularity-formed portion 106x is in the form of a liquid or gel, the resin can be easily applied within a prescribed area because the irregularity-formed portion 106x is formed on the bottom surface of the recess 106d.

Ultrasonic Bonding

No particular limitation is imposed on the conditions for ultrasonically bonding a current collector and a core-stacked portion together. For example, a horn load of 1,000 N to 2,500 N (100 kgf to 250 kgf), a frequency of 19 kHz to 30 kHz, and a bonding time of 200 ms to 500 ms may be used for the ultrasonic bonding. When the frequency is 20 kHz, the horn amplitude may be set to 50% to 90% of the maximum amplitude (e.g., 50 μm). Preferably, by applying ultrasonic vibrations to the core-stacked portion, an oxide film on the surface of the core included in the core-stacked portion and an oxide film on the surface of the current collector are removed by friction, and the stacked layers of the core are solid-phase bonded together, and the core and the current collector are solid-phase bonded together.

Joined Portion

Preferably, the ultrasonic bonding is performed such that the joined portion formed in the core-stacked portion by the ultrasonic bonding is in the following state. By performing the ultrasonic bonding such that the following state is obtained, the force for sandwiching the core-stacked portion and the current collector between the horn and anvil during the ultrasonic bonding does not become excessive, so that the deformation of the current collector can be more effectively reduced.

Figure 16:
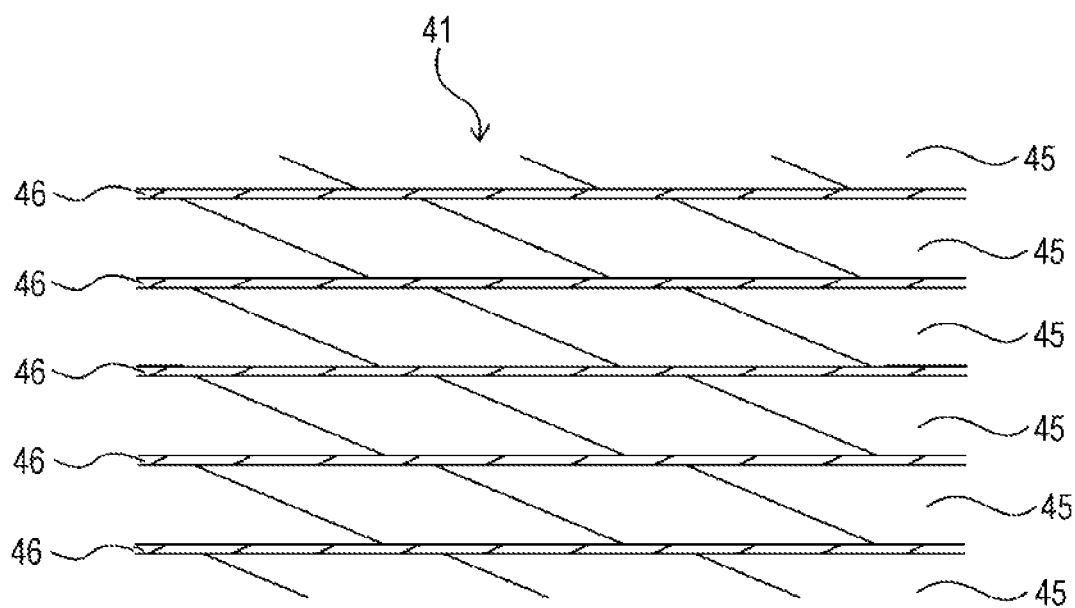
FIG. 16 is an enlarged cross-sectional view of a joined portion of the positive electrode core-stacked portion.
Figure 17A:
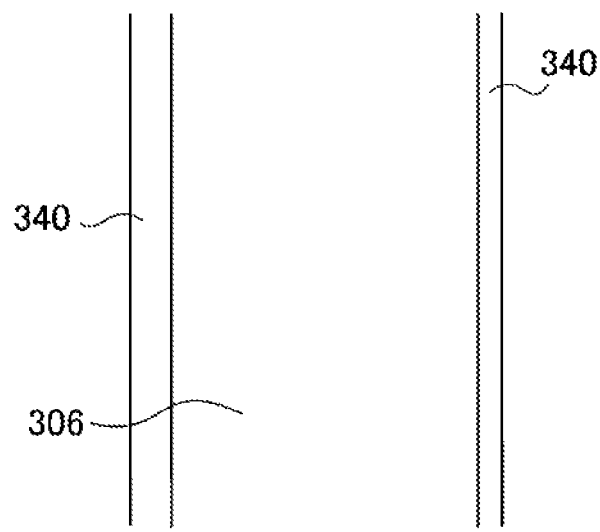
FIG. 17A is an illustration for a conventional technology that shows the state in which a first electrode current collector is disposed on a first core-stacked portion.
Figure 17B:
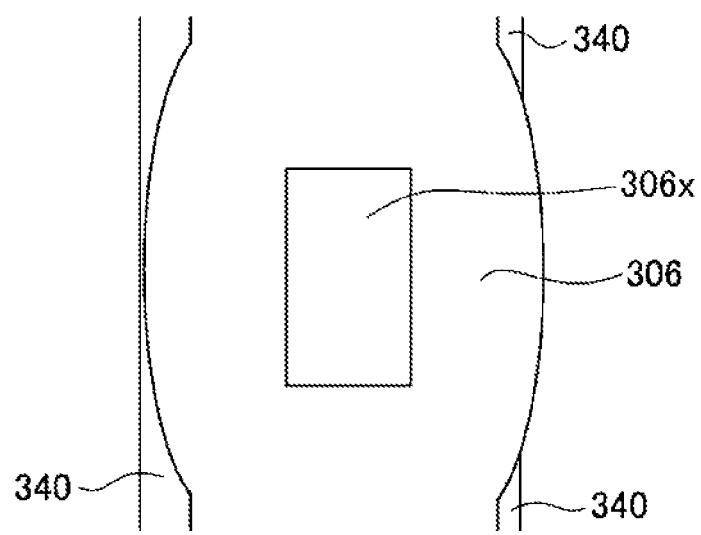
FIG. 17B is an illustration for the conventional technology that shows the state after the first electrode current collector and the first core-stacked portion have been ultrasonically bonded together.

FIG. 16 is an enlarged cross-sectional view of the joined portion 41 formed in the positive electrode core-stacked portion 40 in the above embodiment and modifications 1 to 3. The joined portion 41 includes joint layers 46 each formed by ultrasonically bonding adjacent layers of the positive electrode core 4a. Center layers 45 are present between respective joint layers 46 adjacent in the stacking direction of the positive electrode core 4a. Each layer of the positive electrode core 4a is joined to adjacent layers of the positive electrode core 4a at portions in the vicinities of the opposite outer surfaces of the each layer, and the joint layers 46 are thereby formed. Each center layer 45 is an almost unchanged central portion, with respect to the thickness direction, of the respective layer of the positive electrode core 4a.

Preferably, the average diameter of the crystal grains of aluminum or the aluminum alloy in the joint layers 46 is smaller than the average diameter of the crystal grains of aluminum or the aluminum alloy in the center layers 45. Preferably, the average diameter of the crystal grains of aluminum or the aluminum alloy in the center layers 45 is substantially the same as the average diameter of the crystal grains of aluminum or the aluminum alloy in the positive electrode core 4a around the joined portion 41.

For example, the average diameter (major axis) of the crystal grains of aluminum or the aluminum alloy forming the joint layers 46 is preferably 30 to 70% of the average diameter (major axis) of the crystal grains of aluminum or the aluminum alloy forming the center layers 45 and more preferably 30 to 60%. The aspect ratio (the minor axis:the major axis) of each crystal grain of aluminum or the aluminum alloy forming the joint layers 46 is preferably 1:1 to 1:3. The average diameter (major axis) of the crystal grains of aluminum or the aluminum alloy forming the joint layers 46 is preferably 0.1 to 1.0 μm. The aspect ratio (the minor axis:the major axis) of each crystal grain of aluminum or the aluminum alloy forming the center layers 45 is preferably 1:3 to 1:10. The average diameter (major axis) of the crystal grains of aluminum or the aluminum alloy forming the center layers 45 is preferably 1.7 to 8.0 μm.

The aspect ratio (the minor axis:the major axis) of each crystal grain of aluminum or the aluminum alloy forming the positive electrode core 4a in a portion (a non-ultrasonically bonded portion) around the joined portion 41 in the positive electrode core-stacked portion 40 is preferably 1:3 to 1:10. The average diameter (the major axis) of the crystal grains of aluminum or the aluminum alloy forming the positive electrode core 4a in the portion (the non-ultrasonically bonded portion) around the joined portion 41 in the positive electrode core-stacked portion 40 is preferably 1.7 to 8.0 μm.

Others

In the above embodiment and modifications 1 to 3, the structures of the positive electrode current collector, the method for joining the positive electrode current collector and the positive electrode core-stacked portion, etc. have been described in detail. The structure of the negative electrode current collector, a method for joining the negative electrode current collector and the negative electrode core-stacked portion, etc. may be the same as above.

The secondary battery production method of the present disclosure is applied to at least one of the positive electrode side and the negative electrode side.

In the above embodiment and modifications 1 to 3, the prismatic secondary battery including the flattened wound electrode assembly has been exemplified, but this is not a limitation. The electrode assembly may be a stacked-type electrode assembly in which a plurality of positive electrode plates and a plurality of negative electrode plates are stacked alternately with a separator therebetween. In the stacked-type electrode assembly, a plurality of rectangular core-exposed portions stacked one on another may form a core-stacked portion. In the wound electrode assembly also, a plurality of rectangular core-exposed portions stacked one on another may form a core-stacked portion. The wound electrode assembly may be disposed in the battery case such that the winding axis is perpendicular to the sealing plate. The positive electrode core-stacked portion and the negative electrode core-stacked portion may be disposed in a sealing plate-side edge portion of the electrode assembly.

When the positive electrode core is made of aluminum or an aluminum alloy, the thickness of the positive electrode core is preferably 5 to 30 μm and more preferably 10 to 20 μm. The number of layers of the positive electrode core stacked in the positive electrode core-stacked portion is preferably 10 to 100 and more preferably 30 to 100.

When the negative electrode core is made of copper or a copper alloy, the thickness of the negative electrode core is preferably 5 to 30 μm and more preferably 6 to 15 μm. The number of layers of the negative electrode core stacked in the negative electrode core-stacked portion is preferably 10 to 100 and more preferably 30 to 100.

Well-known materials may be used for the positive electrode plate, the negative electrode plate, the separator, the electrolyte, etc.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for producing a secondary battery,
wherein the secondary battery includes:
an electrode assembly including a first electrode plate, a second electrode plate having a polarity different from the polarity of the first electrode plate, and a separator disposed between the first electrode plate and the second electrode plate, and
a first electrode current collector electrically connected to the first electrode plate,
wherein the first electrode plate includes a first electrode core and a first electrode active material layer formed on the first electrode core, wherein the first electrode core includes a first electrode-core exposed portion on which the first electrode active material layer is not formed, the first electrode-core exposed portion being located at a first end portion of the first electrode core in a first direction, and
the second electrode plate includes a second electrode core and a second electrode active material layer formed on the second electrode core, wherein the second electrode core includes a second electrode-core exposed portion on which the second electrode active material layer is not formed, the second electrode-core exposed portion being located at a second end portion of the second electrode core opposite to the first end portion of the first electrode core in the first direction,
wherein the electrode assembly includes a first electrode core-stacked portion in which the first electrode-core exposed portion is stacked and a second electrode core-stacked portion in which the second electrode-core exposed portion is stacked,
wherein the first electrode core-stacked portion is located in a first end of the electrode assembly, corresponding to the first end portion of the first electrode core, in the first direction, and
wherein the second electrode core-stacked portion is located in a second end of the electrode assembly, which is opposed to the first end and corresponding to the second end portion of the second electrode core, in the first direction,
the method comprising:
an electrode assembly production step of producing the electrode assembly including the first electrode core-stacked portion and the second electrode core-stacked portion; and
an ultrasonic bonding step of ultrasonically bonding the first electrode current collector to the first electrode core-stacked portion,
wherein, in the ultrasonic bonding step, the first electrode current collector has a thin-walled portion having a smaller thickness than an annular thicker portion surrounding the thin-walled portion, the thin-walled portion is smaller than the first electrode core-stacked portion in the first direction, a part of the annular thicker portion is located between an end of the second electrode plate and the thin-walled portion in the first direction, said end of the second electrode plate being an end in the first direction adjacent to the first electrode core-stacked portion, the part of the annular thicker portion includes a rib formed on a surface of the part of the annular thicker portion opposed to a surface of the part of the annular thicker portion facing the first electrode core-stacked portion, in the part of the annular thicker portion, an area where the rib is formed is thicker than another area of the part of the annular thicker portion, and the thin-walled portion and the first electrode core-stacked portion are sandwiched between a horn and an anvil and then ultrasonically bonded together.

2. The method for producing a secondary battery according to claim 1, wherein, in the ultrasonic bonding step, the first electrode current collector has a recess in which the thin-walled portion forms a bottom surface of the recess, and the ultrasonic bonding is performed while the first electrode core-stacked portion abuts against the bottom surface of the recess, the horn abuts against a surface of the first electrode core-stacked portion that is opposite to a surface of the first electrode core-stacked portion that abuts against the bottom surface of the recess, and the anvil abuts against a surface of the thin-walled portion that is opposite to the bottom surface of the recess.

3. The method for producing a secondary battery according to claim 1, wherein, in the ultrasonic bonding step, the first electrode current collector has a recess in which the thin-walled portion forms a bottom surface of the recess, and the ultrasonic bonding is performed with the anvil abutting against the recess.

4. The method for producing a secondary battery according to claim 1, wherein a width of the thin-walled portion in the first direction is from 30 to 95% of a width of the first electrode current collector in the first direction.

5. The method for producing a secondary battery according to claim 1, wherein the first electrode current collector further includes an inclined surface connecting the annular thicker portion to the thin-walled portion.

\* \* \* \* \*